United States Patent [19]
Herr et al.

[11] 3,730,314
[45] May 1, 1973

[54] TRANSMISSION OUTPUT CLUTCH WITH CONDITIONAL OVERRUNNING CAPABILITY

[75] Inventors: Charles H. Herr; Alexander C. McIntosh, both of Peoria, Ill.

[73] Assignee: Caterpillar Tractor Co., Peoria, Ill.

[22] Filed: Sept. 3, 1971

[21] Appl. No.: 177,670

[52] U.S. Cl............192/18 A, 192/47, 192/54, 192/85 AA
[51] Int. Cl...............................F16d 67/04
[58] Field of Search...............192/85 AA, 85 A, 192/57, 54, 18 A

[56] References Cited

UNITED STATES PATENTS

| | | | |
|---|---|---|---|
| 3,567,000 | 3/1971 | Richards | 192/47 |
| 2,799,375 | 7/1957 | Forster | 192/85 AA |

FOREIGN PATENTS OR APPLICATIONS

| | | | |
|---|---|---|---|
| 1,081,772 | 5/1960 | Germany | 192/54 |

*Primary Examiner*—Benjamin W. Wyche
*Attorney*—Charles M. Fryer et al.

[57] ABSTRACT

A clutch for use at the output end of a vehicle transmission in which gears are braked to a stop to facilitate shifting transmits drive in either direction except when a shift is being made at which time an overrunning action is provided. A pair of annular pressure plates engage helical splines on the shaft which connects to the transmission and a series of clutch discs are disposed between the two pressure plates with alternate ones being coupled to the output shaft whereby rotation in either direction normally urges the pressure plates together to compress the clutch discs and transmit drive. To provide the alternate overrunning mode, a fluid pressure controlled piston is shifted to enable one of the pressure plates to travel axially along the helical splines a greater distance than the other clutch plate can travel whereby disc compression occurs only in response to rotation in one particular angular direction. Pressure on the discs is controlled and torque is transmitted thereto by a gear splined to alternate ones of the discs and which is engaged with both of the pressure plates by teeth having sufficient backlash to accommodate to the differential axial movements of the plates. Means are also provided for braking the input shaft during the overrunning mode of operation.

5 Claims, 2 Drawing Figures

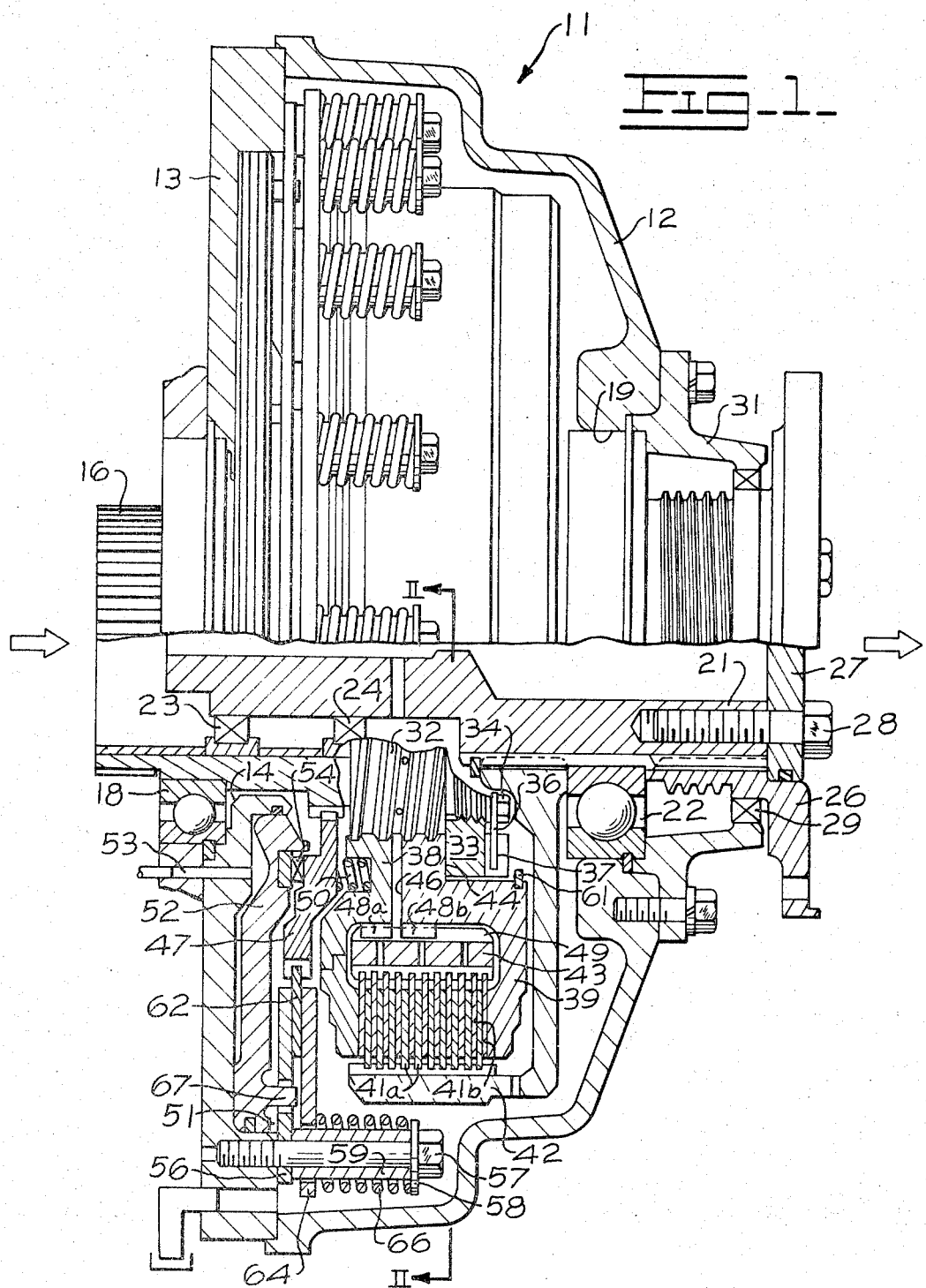

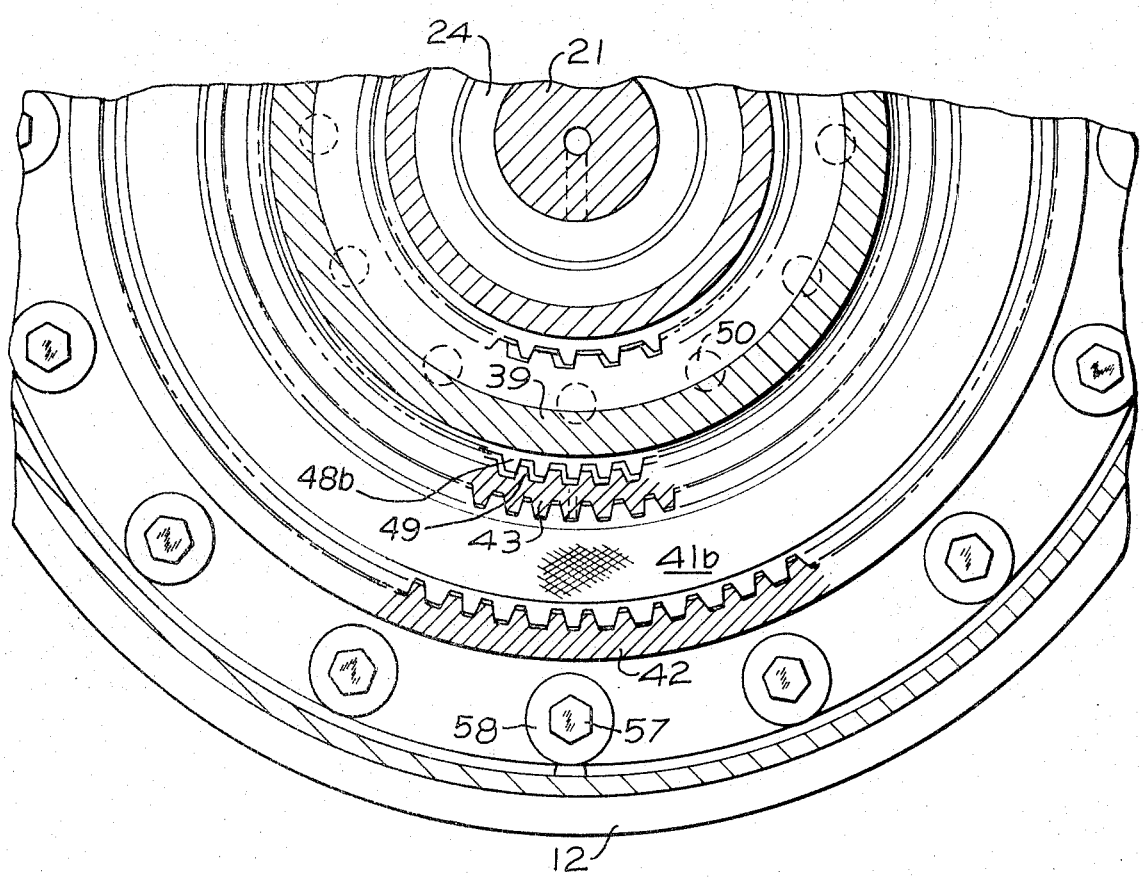

TRANSMISSION OUTPUT CLUTCH WITH CONDITIONAL OVERRUNNING CAPABILITY

BACKGROUND OF THE INVENTION

This invention relates to clutch mechanisms for selectively transmitting torque and more particularly to clutches which normally transmit torque in either rotational sense but which may be conditioned to exhibit overrunning action when necessary.

Certain specialized forms of multi-speed drive transmissions for vehicles or the like require an output clutch mechanism in addition to the more common input clutch that couples the transmission to a driving engine. U.S. Pat. No. 3,508,450 of E. A Richards issued Apr. 28, 1970 discloses a typical transmission of this kind in which the change speed gears have no synchronizors or the like to facilitate shifting. In a transmission of this form, the change speed gears are decoupled from both the driving engine and the driven system at the start of a shift and the gearing section is braked to a stop so that the gears may be shifted while in a stationary condition. Thereafter the gears are recoupled to the engine and driven system to reestablish drive at a new selected gear ratio.

The clutch construction employed at the output end of such a transmission must normally transmit both forward and reverse torque so that the associated vehicle may be driven in either direction and to provide a retarding action when necessary. However smooth shifting may be facilitated if the output clutch exhibits an overrunning action in the course of a gear shift cycle. During that period, the output clutch should disengage as soon as transmission output speed falls below that of the driven system and recoupling of the change speed gears to the driven system should not occur until the gearing system has been reaccelerated through the input clutch to match the speed of the driven system.

These seemingly incompatible requirements are met in the apparatus of U.S. Pat. No. 3,508,450 by employing a form of overrunning clutch between the output of the change speed gears and the driven system and by supplementing this with a solid drive mechanical coupling which is temporarily disengaged during the course of a shift by fluid pressure operated means. In effect two paralleled output clutch mechanisms are provided, one being of the overrunning type and the other being of a solid drive type. Another form of output clutch for a transmission of the type discussed above is described in U.S. Pat. No. 3,567,000 of Elmer A. Richards issued Mar. 2, 1971 for Overrunning Clutch Coupling. The apparatus of U.S. Pat. No. 3,567,000 utilizes a pair of opposed cone clutches carried on helical splines on the input shaft to clasp and friction drive a conical element mounted on the output shaft. This provides two-way torque transmission except when a blocker mechanism, normally limiting travel of one of the cone clutches, is deactivated during a shift period to impart an overrunning action to the clutch assembly.

In output clutches of this type, the timing of engagement and disengagement in relation to applied torque forces should not vary appreciably as careful synchronization with the actions of the input clutch and change speed gears of the transmission is desirable. To meet this objective, prior output clutches require frequent precise adjustments to compensate for wear and other variables and it is highly desirable that these maintenance requirements be reduced.

SUMMARY OF THE INVENTION

The present invention is a clutch assembly which normally transmits torque in either direction but which may be caused to perform an overrunning action when desirable and which exhibits prolonged reliability with respect to the timing of engagement and disengagement relative to applied torque forces.

A pair of pressure plates are disposed on a first clutch shaft and engage a helical spline thereon and a plurality of clutch discs are disposed between the pressure plate and are splined to a second clutch shaft. Stop means are provided to limit the axial movements of the plates along the helical spline which result from rotational motion. Accordingly, rotation of either shaft normally causes the clutch pack to be compressed for transmission of torque in either direction. To provide for the overrunning action, one of the stops is retractable to enable one pressure plate to move further in one direction than the other whereby torque transmission can occur only in one direction at such time. To better control timing and clutch capacity and to increase the torque transmitting capability of the clutch without an undesirable increase in size, both pressure plates are engaged by a ring gear member which also engages alternate ones of the clutch discs, the engagement between the gear and the pressure plates having sufficient backlash to provide for the differential axial movement of the pressure plates as discussed above.

Accordingly it is an object of this invention to provide a clutch construction which normally transmits torque in either direction and which may be conditioned to provide an overrunning action wherein the clutch reliably and consistently engages and disengages in response to applied forces over a long period of operation.

The invention together with further objects and advantages thereof will best be understood by reference to the following description of preferred embodiments taken in conjunction with the accompanying drawings.

BRIEF DESCRIPTION OF THE DRAWINGS

In the drawings:

FIG. 1 is a side view, partially broken out and partially in axial section, of a clutch construction in accordance with the invention, and FIG. 2 is a section view of a portion of the mechanism of FIG. 1 taken along line II—II thereof.

DESCRIPTION OF A PREFERRED EMBODIMENT

Referring now to the drawings, a clutch assembly 11 has a dished annular housing 12 closed at the front end by a circular endplate 13. Endplate 13 has a central opening 14 into which a drive input shaft 16 extends in coaxial relationship to the housing, a bearing 18 being situated between the shaft and opening 14 whereby the shaft may rotate relative to the housing. Housing 12 has another circular opening 19 in the rear wall into which an output shaft 21 extends, an additional bearing 22 being situated between the output shaft and the wall of opening 19. Both shafts 16 and 21 are hollow and the output shaft 21 is of a stepped configuration whereby the forward end of the output shaft extends within the rearward end of the input shaft 16 and an additional pair of axially spaced bearings 23 and 24 are disposed between the two shafts in coaxial relationship therewith. An output flange 26 is splined to the end of output shaft 21 which extends from housing opening 19 and is retained on the output shaft by an end disc 27 secured to the end of the output shaft by bolts 28. To close the back end of the housing, a seal 29 is disposed between flange 26 and an annular bracket 31 which is secured to the exterior wall of housing 12 at opening 19.

Input shaft 16 may be coupled to the output of the change speed gear section of a stop and go transmission of the form described, for example, in U. S. Pat. No. 3,508,450 while output flange 26 may be coupled to the drive line of a vehicle or other driven system. As discussed above, the primary function of the output clutch assembly 11 is to provide a normal mode of operation in which a driving connection is formed between input shaft 16 and output shaft 21 for transmitting torque in either direction while providing an alternate overrunning mode of operation in which rotation of the output shaft is not transmitted to the input shaft but rotation of the input shaft is transmitted to the output shaft after the input shaft speed reaches a value equal to that of the output shaft.

Considering now the mechanism through which these two modes of operation are realized, a portion of the input shaft 16 within housing 12 is provided with a helical spline 32. The inner end of the input shaft 16 is threaded and an annular rear stop 33 is engaged thereon. A bolt 34 in the end of input shaft 16 secures a finger 36 thereon which extends into a slot 37 in stop 33 to prevent rotation of the stop relative to the shaft. Annular pressure plates including front plate 38 and rear pressure plate 39 are disposed coaxially on input shaft 16 within housing 12 and each is internally threaded to engage with helical spline 32 whereby any relative angular motion between the pressure plates and the input shaft shifts the plates axially on the shaft. If such axial motion of one of the pressure plates 38 and 39 is blocked, the rotational force tends to urge the other plate towards the blocked one, and this property is utilized to provide the desired clutching action as will hereinafter be described in more detail.

A plurality of annular clutch discs 41a and 41b are disposed between the radially outermost portions of pressure plates 38 and 39 in coaxial relation therewith and in position to be compressed together when one pressure plate moves towards the other. AlternAte ones 41a of the clutch disc are splined to an annular hub 42 which is in turn spline connected to the output shaft 21 in coaxial relationship therewith. The intervening ones 41b of the clutch disc are splined to a ring gear 43 disposed between the pressure plates 38 and 39 radially inward from the clutch discs. Accordingly, if the pressure plates 38 and 39 are urged together by rotation of the input shaft 16 including helical spline 32, clutch discs 41 are compressed to transmit drive from the input shaft to hub 42 and thus to the output shaft 21. To cause the pressure plates 38 and 39 to be urged together in this manner when the input shaft 16 rotates in a clockwise sense when viewed from the front end of the clutch, the rear pressure plate 39 is provided with a surface 44 which abuts stop 33 after a small amount of axial travel and clearance space 46 is provided between the two pressure plates so that the forward pressure plate 38 continues to be urged rearwardly by helical spline 32 to apply the desired compressive force to the clutch discs 41.

If the rotation of input shaft 16 is in an opposite sense, helical splines 32 shift both pressure plates 38 and 39 in a forward direction. In this case, except during a transient as hereinafter discussed, the axial movement of the pressure plates 38 and 39 is limited by abutment of forward pressure plate 38 against pressurized piston 52, after going through brake carrier 47 and thrust bearing 54. Once forward movement of pressure plate 38 is stopped in this manner, the tendency of rear pressure plate 39 to continue such movement under the influence of helical spline 32 again causes a compressive force on clutch plates 41.

Thus, in the normal mode of operation, clutch discs 41 are compressed when input shaft 16 rotates in either angular direction. Disc compression also occurs under reversed torque flow conditions such as occurs when the output shaft 21 becomes the driving member due to sudden deceleration of the engine, travel of the vehicle down a slope or other causes. The drag exerted on the pressure plates 38 and 39 through the clutch discs 41 under this condition is sufficient to wind the plates along helical spline 32 until disc compression again occurs as described above. While a momentary release of pressure on the clutch discs occurs during this torque flow reversal, while the pressure plates 38 and 39 travel from one end of helical spline 32 to the other end, the release is very brief and scarcely detectable by the operator of the vehicle.

The compression of the discs 41 to engage the clutch is, as described above, dependent upon a small amount of rotation of pressure plates 38 and 39 relative to the input shaft and relative to each other as applied torque forces change. While the inertia or momentum of the plates 38 and 39 tends to produce the necessary relative rotations, these reactions are assured by the small amount of torque or drag which is always transmitted through clutch discs 41 of this kind even when the clutch is in what is termed the disengaged condition. Due to the drag through the clutch discs 41 and the similar drag at helical spline 32, the pressure plates 38 and 39 attempt to turn at a rate intermediate between the speed of the input shaft 16 and output shaft 21. In order to enhance the sensitivity of this response to shifts in the applied torque forces, a plurality of light compression springs 50 are disposed between brake carrier 47 and the front pressure plate 38 to urge the plate 38 towards plate 39.

In the absence of additional structure to be described, the clutch assembly 11 would exhibit several operational characteristics which might cause some inconsistency of response and which would not make full use of the torque transmitting capabilities of the clutch discs 41. There might, for example, be slight differences in the timing of response of the two pressure plates 38 and 39 from cycle to cycle. In addition, there would be no well defined limit to the compressive force which the plates 38 and 39 might apply to the discs 41. Further, only the end ones of the discs 41 which are directly contacted by the plates 38 and 39 would provide surfaces for transmitting torque. Considering now the means whereby each of these problems is resolved, pressure plate 38 is provided with gear teeth 48a and pressure plate 39 is provided with gear teeth 48b, with both sets of gear teeth engaging a single set of teeth 49 on the inside surface of ring gear 43. As best illustrated in FIG. 2 in particular, a substantial degree of backlash is provided for between teeth 48 of the pressure plates and teeth 49 of the ring gear in order to allow the amount of relative rotation of one plate relative to the other necessary for compressing and releasing the clutch discs 41 in an optimum manner as described above. However, the backlash also fixes a limit to the maximum and minimum amount of axial separation of the plates 38 and 39 which can be present to introduce consistency into the modulation rate when the clutch engages and to establish a maximum degree of compression. Further, the abutment of teeth 48 and 49 which occurs during engagement, after the backlash is taken up, causes all torque, with the exception of friction surfaces contacting pressure plates without relative motion, to be transmitted directly through all adjacent surfaces of all clutch discs 41.

Considering now the means by which the clutch 11 may be caused to exhibit an overrunning action when necessary for shifting an associated transmission or for other purposes, an annular well 51 is formed in the inner face of the front end member 13 of the housing and an annular piston 52 is disposed therein, the piston being movable in an axial direction in response to fluid pressure signals received from suitable control apparatus through a passage 53 in housing member 13. One example of a suitable pneumatic control system adaptable to a clutch assembly of the form herein described as an output coupler for a stop and go transmission is described in detail in U.S. Pat. No. 3,570,636 issued on Mar. 16, 1971 to Maurice F. Franz, et al. for Pneumatic Shift Control For A Mechanical Transmission.

A thrust bearing 54 is disposed between piston 52 and brake carrier 47 whereby motion of the piston towards the pressure plates in response to fluid pressure in chamber 51 is transmitted to the brake carrier which as previously described constitutes the stop that limits forward motion of the pressure plates 38 on input shaft 16. Under the normal condition, when it is desired that torque be transmitted through the clutch in either direction, piston 52 is shifted towards the pressure plates in this manner with such motion being limited by abutment of the piston against a stop 56. Stop 56 is secured to the inner surface of housing end member 13 by a plurality of bolts 57 each having a washer 58 and sleeve 59 thereon with one end of the sleeve abutting the stop 56.

With piston 52 shifted in this manner, pressure plates 38 and 39 shift axially along input shaft 16 to abut either rear stop 33 or the brake carrier 47 as previously described according to the direction of torque transmission through the clutch. To achieve the overrunning mode of operation, fluid pressure is released from chamber 51. At this time the clutch 11 continues to transmit torque from input shaft 16 to output shaft 21 as long as the direction of drive transmission is from the input shaft to the output shaft. However if the speed of the input shaft decreases below that of the output shaft pressure plates 38 and 39 travel toward the front of the clutch assembly owing to the action of spline 32. As piston 52 and brake carrier 47 are no longer being held in the extreme rearward position by fluid pressure, both pressure plates 38 and 39 may travel further toward the front of the clutch assembly than was the case under the normal mode of operation. Such motion of the rear pressure plate 39 is eventually stopped by abutment of a lip ring 61 carried by plate 39 against the rear stop 33. However the forward motion of front pressure plate 38 is not limited at the same point and thus plate 38 may move a small distance further as the front stop defined by brake carrier 47 may also move forwardly due to the retraction of piston 52. Accordingly, the compressive force on the clutch discs 41 is relieved and the clutch disengages.

When a clutch of this form is used with a transmission of the type discussed above, it may be desirable not only to provide for an overrunning action during a gear shift period but also to automatically apply a braking force to the input shaft 16 at such time to facilitate stopping of change speed gears so that shifting may be performed without synchronizers. For this purpose a flat annular brake disc 62 is splined to carrier 47 and overlaps the previously described piston stop 56. Situated on the opposite side of brake disc 62 from stop 56 is a flat annular brake member 64 which is slidable along sleeves 59 of bolts 57 and which is urged towards the brake disc by springs 66 disposed coaxially on the bolts. Thus the brake member 64 presses the brake disc 62 against stop 56 to apply the desired braking force during the overrunning mode of clutch operation. The brake is held disengaged during the normal mode of clutch operation in that piston 52 is provided with projections 67 which extend through apertures in stop 56 to force brake member 64 away from the brake disc 62 when the piston is moved rearwardly by fluid pressure in chamber 51.

While the invention has been described with respect to a single exemplary embodiment, it will be apparent that many modifications are possible and it is not intended to limit the invention except as defined in the following claims.

What is claimed is:

1. A clutch for transmitting torque comprising:
   first and second rotatable shafts (16, 21), said first shaft having a helical spline (32) thereon,
   first and second pressure plates (39, 38) disposed on said first shaft and engaging said helical spline thereof whereby said pressure plates are urged axially along said shaft upon rotation relative thereto,
   a first stop element (33) limiting axial movement of said pressure plates along said first shaft in a first direction,
   a second stop element (47) limiting axial movement of said pressure plates along said first shaft in an opposite direction,
   a plurality of clutch discs (41) disposed between said pressure plates,
   means (42) coupling a first group (41a) of said clutch discs to said second shaft for rotation therewith,
   means (61) restricting axial movement of said first pressure plate relative to said first stop element to a distance less than the distance which said second pressure plate is capable of moving relative to said first stop element, means (52) for releasing said second stop element to enable said second plate to move away from said first stop element a distance greater than said first plate may move away therefrom, whereby said clutch exhibits an overrunning action when said second stop element is released and otherwise transmits torque in either direction, and means (43) connected between said pressure plates for limiting the amount of rotation which one of said plates may undergo relative to the other of said plates whereby a predetermined maximum and minimum axial separation of said plates is established and maintained.

2. A clutch as defined in claim 1 wherein said pressure plates each have gear teeth (48) thereon and wherein said means connected between said pressure plates comprises a ring gear disposed coaxially between said plates and having gear teeth (49) which engage with said gear teeth of each of said plates with a predetermined degree of backlash.

3. A clutch as defined in claim 2 wherein a second group (41b) of said clutch discs are splined to said ring gear.

4. A clutch for transmitting torque comprising: first and second rotatable shafts (16, 21), said first shaft having a helical spline (32) thereon, first and second pressure plates (39, 38) disposed on said first shaft and engaging said helical spline thereof whereby said pressure plates are urged axially along said shaft upon rotation relative thereto, a first stop element (33) limiting axial movement of said pressure plates along said first shaft in a first direction, a second stop element (47) limiting axial movement of said pressure plates along said first shaft in an opposite direction, a plurality of clutch discs (41) disposed between said pressure plates, means (42) coupling a first group (41a) of said clutch discs to said second shaft for rotation therewith, means (61) restricting axial movement of said first pressure plate relative to said first stop element to a distance less than the distance which said second pressure plate is capable of moving relative to said first stop element, means (52) for releasing said second stop element to enable said second plate to move away from said first stop element a distance greater than said first plate may move away therefrom, wherein said means for releasing said second stop element comprises a fluid pressure controlled piston for selectively shifting said second stop element in an axial direction relative to said first shaft, whereby said clutch exhibits an overrunning action when said second stop element is released and otherwise transmits torque in either direction, a brake disc (62) coupled to said first shaft, a braking member (64) movable into engagement with said brake disc, resilient means (66) urging said braking member towards engagement with said brake disc, and means (67) operated by said piston for holding said braking member out of engagement with said brake disc except when said second stop element is released.

5. A clutch mechanism comprising:

a housing (12).

an input shaft (16) extending into said housing and journalled for rotation relative thereto, said input shaft having a helically splined portion (32) within said housing, an output shaft (21) extending into said housing in coaxial relationship to said input shaft and being journalled for rotation relative thereto, a first annular pressure plate (39) disposed coaxially on said input shaft and engaging said helically splined portion thereof, said first plate having gear teeth, a second annular pressure plate (38) disposed coaxially on said input shaft and engaging said helically splined portion thereof, said second plate having gear teeth, a plurality of annular clutch discs (41) disposed between said first and second pressure plates in coaxial relationship thereto, an annular hub (42) disposed coaxially with respect to said output shaft and being coupled thereto for rotation therewith, said annular hub being spline connected to alternate ones of said clutch discs, a ring gear (43) disposed between said first and second pressure plates in coaxial relationship therewith and having gear teeth engaging said gear teeth of each of said pressure plates with a predetermined amount of backlash whereby said pressure plates may undergo a predetermined amount of relative rotation, said ring gear being spline connected to the others of said clutch discs, a first annular stop (33) disposed on said input shaft at the end of said helically splined portion thereof which is adjacent said output shaft, means (61) limiting axial movement of said first pressure plate relative to said first stop to a distance less than the distance which said second pressure plate may move relative thereto, a second annular stop (47) disposed on said input shaft at the opposite end of said helically splined portion thereof, said second stop being movable axially along said input shaft between a first position at which said second pressure plate is prevented from moving a distance greater than said first pressure plate may move and a second position at which said second pressure plate may move a greater distance along said input shaft than said first pressure plate, and control means (52) for holding said second stop at said first position and for selectively releasing said second stop for movement to said second position to impart an overrunning action to said clutch.

* * * * *